US008503941B2

(12) United States Patent
Erdos et al.

(10) Patent No.: US 8,503,941 B2

(45) Date of Patent: Aug. 6, 2013

(54) SYSTEM AND METHOD FOR OPTIMIZED UNMANNED VEHICLE COMMUNICATION USING TELEMETRY

(75) Inventors: David Erdos, Rogersville, MO (US); Timothy M. Mitchell, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1127 days.

(21) Appl. No.: 12/034,979

(22) Filed: Feb. 21, 2008

(65) Prior Publication Data

US 2012/0235863 A1 Sep. 20, 2012

(51) Int. Cl.

*H04B 1/00* (2006.01)
*H04W 4/00* (2009.01)
*H04M 1/00* (2006.01)

(52) U.S. Cl.

USPC .......... 455/63.4; 455/430; 455/431; 455/434; 455/562.1

(58) Field of Classification Search

USPC .................. 455/7, 11.1, 12.1, 13.1–13.3, 24, 455/63.4, 418–420, 427–431, 456.1, 524, 455/560–561, 15–16, 403, 433–434, 455, 455/500, 502, 562.1; 342/158, 351–356, 342/357.2–357.22, 357.39, 357.395, 359, 342/367–368, 371, 386, 417; 343/754; 370/315–316, 334, 339

See application file for complete search history.

(56) References Cited

U.S. PATENT DOCUMENTS

| | | | |
|---|---|---|---|
| 4,259,674 | A | 3/1981 | Dragone et al. |
| 4,806,941 | A | 2/1989 | Knochel et al. |
| 5,008,678 | A | 4/1991 | Herman |
| 5,023,624 | A | 6/1991 | Heckaman et al. |
| 5,136,304 | A | 8/1992 | Peters |
| 5,184,141 | A | 2/1993 | Connolly et al. |
| 5,219,377 | A | 6/1993 | Poradish |
| 5,276,455 | A | 1/1994 | Fitzsimmons et al. |

(Continued)

FOREIGN PATENT DOCUMENTS

| | | |
|---|---|---|
| EP | 0 889 542 | 1/1999 |
| EP | 0 889 543 | 1/1999 |

(Continued)

OTHER PUBLICATIONS

Fitzsimmons, George W.; Lamberty, Bernie J.; Harvey, Donn T.; Riemer, Dietrich E.; Vertatschitsch, Ed J.; and Wallace, Jack E. "A Connectorless Module for an EHF Phased-Array Antenna," Publication from Microwave Journal, Jan. 1994, 8 pages.

(Continued)

*Primary Examiner* — Meless Zewdu

(74) *Attorney, Agent, or Firm* — Harness, Dickey & Pierce, P.L.C.

(57) ABSTRACT

In one embodiment a communications system includes an unmanned vehicle and a communications station located remote from the unmanned vehicle. The unmanned vehicle has a first wireless communications system and a first directional antenna for wirelessly communicating with the remote communications station. A first antenna control system tracks the remote communications station and aims the first directional antenna, in real time, at the remote communications station during wireless communications with the remote communications station. The remote communications station has a second wireless communications system having a second directional antenna for wirelessly communicating with the unmanned vehicle. A second antenna control system of the remote communications station tracks the unmanned vehicle and aims the second directional antenna at the unmanned vehicle, in real time, during wireless communications with the unmanned vehicle.

14 Claims, 2 Drawing Sheets

(56) References Cited

U.S. PATENT DOCUMENTS

| | | | | | |
|---|---|---|---|---|---|
| 5,434,581 | A | | 7/1995 | Raguenet et al. | |
| 5,444,762 | A | * | 8/1995 | Frey et al. | 455/431 |
| 5,488,380 | A | | 1/1996 | Harvey et al. | |
| 5,539,420 | A | | 7/1996 | Dusseux et al. | |
| 5,557,291 | A | | 9/1996 | Chu et al. | |
| 5,675,345 | A | | 10/1997 | Pozgay et al. | |
| 5,825,333 | A | | 10/1998 | Kudoh et al. | |
| 5,854,607 | A | | 12/1998 | Kinghorn | |
| 5,886,671 | A | | 3/1999 | Riemer et al. | |
| 5,923,289 | A | | 7/1999 | Buer et al. | |
| 5,949,766 | A | * | 9/1999 | Ibanez-Meier et al. | 370/316 |
| 5,982,250 | A | | 11/1999 | Hung et al. | |
| 5,990,835 | A | | 11/1999 | Kuntzsch et al. | |
| 6,018,659 | A | | 1/2000 | Ayyagari et al. | |
| 6,154,176 | A | | 11/2000 | Fathy et al. | |
| 6,166,705 | A | | 12/2000 | Mast et al. | |
| 6,211,824 | B1 | | 4/2001 | Holden et al. | |
| 6,232,919 | B1 | | 5/2001 | Marumoto et al. | |
| 6,249,439 | B1 | | 6/2001 | DeMore et al. | |
| 6,297,774 | B1 | | 10/2001 | Chung | |
| 6,297,775 | B1 | | 10/2001 | Haws et al. | |
| 6,320,547 | B1 | | 11/2001 | Fathy et al. | |
| 6,396,440 | B1 | | 5/2002 | Chen | |
| 6,404,401 | B2 | | 6/2002 | Gilbert et al. | |
| 6,407,704 | B1 | | 6/2002 | Franey et al. | |
| 6,424,313 | B1 | | 7/2002 | Navarro et al. | |
| 6,429,816 | B1 | | 8/2002 | Whybrew et al. | |
| 6,504,724 | B2 | | 1/2003 | Serizawa et al. | |
| 6,535,169 | B2 | | 3/2003 | Fourdeux et al. | |
| 6,580,402 | B2 | | 6/2003 | Navarro et al. | |
| 6,617,510 | B2 | | 9/2003 | Schreiber et al. | |
| 6,642,894 | B1 | | 11/2003 | Gross et al. | |
| 6,670,930 | B2 | | 12/2003 | Navarro | |
| 6,687,969 | B1 | | 2/2004 | Dando | |
| 6,693,588 | B1 | | 2/2004 | Schlee | |
| 6,698,091 | B1 | | 3/2004 | Heston et al. | |
| 6,700,052 | B2 | | 3/2004 | Bell | |
| 6,718,815 | B2 | | 4/2004 | Fantini | |
| 6,749,459 | B2 | | 6/2004 | Koch et al. | |
| 6,750,539 | B2 | | 6/2004 | Haba et al. | |
| 6,771,608 | B2 | | 8/2004 | Tillotson | |
| 6,870,517 | B1 | | 3/2005 | Anderson | |
| 6,900,765 | B2 | | 5/2005 | Navarro et al. | |
| 6,938,325 | B2 | | 9/2005 | Tanielian | |
| 6,952,345 | B2 | | 10/2005 | Weber et al. | |
| 6,989,791 | B2 | | 1/2006 | Navarro et al. | |
| 7,092,255 | B2 | | 8/2006 | Barson et al. | |
| 7,110,260 | B2 | | 9/2006 | Weber et al. | |
| 7,129,908 | B2 | | 10/2006 | Edward et al. | |
| 7,187,342 | B2 | | 3/2007 | Heisen et al. | |
| 7,289,078 | B2 | | 10/2007 | Navarro | |
| 7,299,130 | B2 | * | 11/2007 | Mulligan et al. | 701/213 |
| 7,663,546 | B1 | * | 2/2010 | Miyamoto et al. | 342/370 |
| 7,747,364 | B2 | * | 6/2010 | Roy et al. | 701/28 |
| 7,894,948 | B2 | * | 2/2011 | Stroud | 701/3 |
| 2003/0164794 | A1 | * | 9/2003 | Haynes et al. | 342/353 |
| 2004/0242152 | A1 | * | 12/2004 | Jarett | 455/12.1 |
| 2006/0058928 | A1 | * | 3/2006 | Beard et al. | 701/11 |
| 2008/0088508 | A1 | * | 4/2008 | Smith | 342/453 |
| 2010/0256961 | A1 | * | 10/2010 | Bush | 703/8 |

FOREIGN PATENT DOCUMENTS

| | | |
|---|---|---|
| EP | 0 910 134 | 4/1999 |
| EP | 1 094 541 | 4/2001 |
| EP | 1 381 083 | 1/2004 |
| GB | 2344221 | 5/2000 |
| JP | 10-270935 | 9/1998 |
| WO | WO 99/34477 | 7/1999 |
| WO | WO 00/39893 | 7/2000 |
| WO | WO 00/76087 | 12/2000 |
| WO | WO 02/09236 | 1/2002 |
| WO | WO 02/23966 | 3/2002 |

OTHER PUBLICATIONS

Wong, H. et al. An EHF Backplate Design for Airborne Active Phased Array Antennas, Hughes Aircraft Company, El Segundo, CA, IEEE, 1991, pp. 1253 and 1256.

Wallace, Jack; Redd, Harold; and Furlow, Robert. "Low Cost MMIC DBS Chip Sets for Phased Array Applications," IEEE, 1999, 4 pages.

Rogers Corporation, Data Sheet, "RT/duroid® 5870/5880 High Frequency Laminates," Publication No. 92-101, 2 pages.

Rogers Corporation, Properties, "The Advantage of Nearly Isotropic Dielectric Constant for RT/duroid® 5870-5880 Glass Microfiber-PTFE Composite," Publication No. 92-212, 2 pages.

* cited by examiner

SYSTEM AND METHOD FOR OPTIMIZED UNMANNED VEHICLE COMMUNICATION USING TELEMETRY

FIELD

The present disclosure relates to the operation of unmanned vehicles, and more particularly to a system and method for optimizing the RF telemetry capability of a UAV.

BACKGROUND

The statements in this section merely provide background information related to the present disclosure and may not constitute prior art.

Unmanned Aerial Vehicles (UAVs), alternatively Unmanned Air Vehicles, are growing in importance for both military and non-military applications. UAVs typically make use of an on-board antenna, and more typically an omnidirectional on-board antenna, to wirelessly transmit information back to a ground station or base station. Typically, extra power is used to transmit Radio Frequency (RF) signals from the UAV beyond what might otherwise be needed because of various factors that might negatively influence the integrity of the RF link between the base station and the UAV. Such factors could be the changing attitude of the UAV as it flies, or possibly topographic obstructions, or even localized weather conditions (e.g., thunderstorms), that can be expected to significantly degrade the RF link between the UAV and the base station. For this reason, the transmit power used for the RF transmitter is set to a value that, during many times of use of the UAV, will be significantly more than what is needed. This factor limits the range of the UAV because excess electrical power from the UAV's on-board battery will be utilized by the on-board RF system during a given mission or operation.

The need to use extra power with an omnidirectional antenna on a UAV also gives rise to another, sometimes undesirable feature, and that is the detectability of the UAV (or interception of RF communications radiated from it) by other electronic detection systems. The use of an omnidirectional antenna broadcasts the RF signals transmitted by the UAV in an omnidirectional pattern that may facilitate radio-location of the vehicle and/or interception of communications.

SUMMARY

In one embodiment the system comprises an unmanned vehicle and a communications station located remote from the unmanned vehicle. The unmanned vehicle may include a first wireless communications system and a first directional antenna for wirelessly communicating with the remote communications station. A first antenna control system on the unmanned vehicle tracks the remote communications station and aims the first directional antenna, in real time, at the remote communications station during wireless communications with the remote communications station. The remote communications station may include a second wireless communications system and a second directional antenna for wirelessly communicating with the unmanned vehicle, and a second antenna control system that tracks the unmanned vehicle and aims the directional antenna at the unmanned vehicle, in real time, during wireless communications with the unmanned vehicle.

In another aspect of the present disclosure an unmanned vehicle is disclosed. The unmanned vehicle comprises a wireless communications system and a directional antenna for facilitating wireless communications with a remote subsystem. An antenna control system is included that aims the directional antenna to track the remote subsystem during wireless communications with the remote subsystem.

In another aspect of the present disclosure a base station for wirelessly communicating with a remote mobile vehicle is disclosed. The base station includes a wireless communications system and a directional antenna for wirelessly communicating with the remote mobile vehicle. An antenna control system is included that tracks the remote mobile vehicle and maintains the second directional antenna aimed at the remote mobile vehicle during wireless communications with the remote mobile vehicle.

In another aspect of the present disclosure a method for communicating between a moving unmanned vehicle and a remote communications station is disclosed. The method may include using an unmanned vehicle to wirelessly communicate with the remote communications station and controlling a first directional antenna of the unmanned vehicle such that the first directional antenna tracks the remote communications station in real time. A second directional antenna is used at the remote communications station to track the unmanned vehicle in real time.

In still another aspect of the present disclosure a method for wirelessly communicating with an unmanned vehicle is disclosed. The method may comprise using a directional antenna on the unmanned vehicle for facilitating wireless communications with a remote subsystem. An antenna control system on the unmanned vehicle may be used to aim the directional antenna to track the remote subsystem during wireless communications with the remote subsystem.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
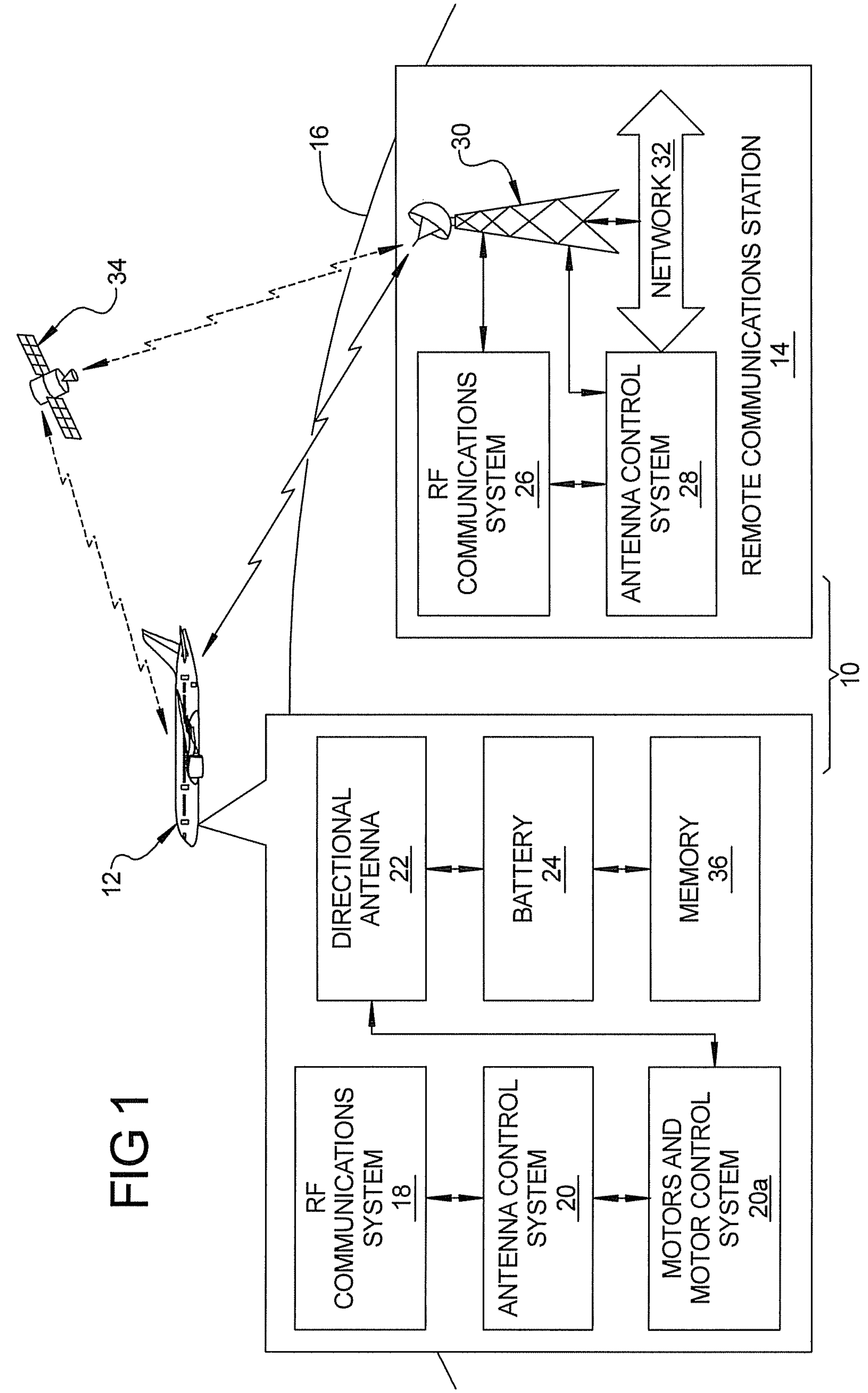
FIG. 1 is a high level block diagram of an overall system in accordance with one embodiment of the present disclosure.

Referring to FIG. 1, there is shown a communications system 10 for enabling communications between an unmanned vehicle 12 and a remote communications station 14. In this example the unmanned vehicle is shown as an unmanned aerial/air vehicle (hereafter referred to as a "UAV"), although it will be appreciated that the present disclosure could just as readily be employed with land vehicles or marine vessels. Thus, the following discussion and claims will be understood as encompassing any type of mobile vehicle, whether of the airborne, land-based or sea-based type. Similarly, the communications station 14 is shown as a non-moving, terrestrial based communications station located on the Earth 16, and may be thought of as a "base"

station. However, the communications station 14 could be located on some form of mobile platform as well, and therefore need not be stationary. Both implementations are contemplated by the present disclosure.

The UAV 12 includes an electromagnetic wave (i.e., wireless) communications system 18, which for convenience will be referred to as the "RF communications system". The UAV 12 also includes an antenna control system 20 that is used to aim a directional antenna 22 at desired elevation and azimuth angles needed to track the communications station 14. A servo motor system 20*a* including one or more servo motors may be used for this purpose to control the elevation and azimuth positioning of the directional antenna 22. A battery 24 provides electrical power for the RF communications system 12 and other electrically powered components of the UAV 12. The communications station 14 similarly includes a wireless communications system 26 (hereinafter simply the "RF communications system"), an antenna control system 28, a directional antenna 30, and optionally a network 32, such as a wide area network (WAN) or a local area network (LAN), for communicating information between the systems 26 and 28 and the antenna 30.

Each of the directional antennas 22 and 30 may comprise mechanically scanned reflector antennas or phased array antennas. Any type of antenna that can electrically or mechanically aim a directional beam at the communications station 14 is contemplated by the present disclosure. Similarly, while it is expected that electromagnetic wave transmissions may be the medium that is typically used with the system 10, the use of optical signals is also contemplated. For example, the use of optical transmitting and receiving devices could just as readily be implemented with the present system.

In FIG. 1 a satellite 34 is shown orbiting the Earth 16. In an alternative implementation, it is contemplated that the satellite 34 could be used to transpond location information relating to the UAV 12 to the communications station 14. In this manner, the communications station 14 may use the received location information to track the UAV 12 so that possible intermittent interference does not adversely affect the tracking of the UAV by the communications station 14. Such intermittent interference may result from topographic conditions, for example from buildings, mountains, etc. Another source of intermittent interference may involve weather anomalies such as localized thunder storms.

In general operation, the RF communications system 18 of the UAV 12 generates information, certain portions of which may comprise location information obtained from its own on-board navigation equipment. This information is transmitted via the directional antenna 22 to the directional antenna 30 of the communications station 14. The directional antenna 22 on the UAV 12 is controlled by the antenna control system 20 preferably via a closed loop arrangement. Alternatively, an open loop control arrangement could be implemented if a memory subsystem 36 is employed to store the location coordinates, such as latitude and longitude, of the communications station 14. In this manner aiming of the directional antenna 22 could still be accomplished but in an open loop fashion. In either implementation, the directional antenna 22 on the UAV 12 closely tracks the antenna 30 of the communications station 14, in real time (i.e., essentially instantaneously) while communicating with the communications station 14.

The communications station 14 uses its RF communications system 26 to wirelessly communicate with the UAV 12. The antenna control system 28 forms a real time system, and in one implementation a real time closed loop system, that controls the pointing of the directional antenna 30 so that the directional antenna 30 continuously tracks the UAV 12 as it travels. Data may be communicated directly from the RF communications system 26 via suitable cabling (e.g., coaxial cabling) connecting the antenna control system 28 and the antenna 30, or also via the network 32.

Thus, it will be appreciated that the above arrangement forms two independent, real time, antenna pointing control loops: one that is carried out by the components 18, 20 and 20*a* of the UAV 12 and the other that is carried out by the communications station 14. This provides significant redundancy and ensures that if either the UAV 12 antenna control system 20 or the antenna control system 28 of the communications station 14 becomes inoperable for any reason, that the communications station 14 will still be able to track the UAV 12 with its antenna 30.

Figure 2:
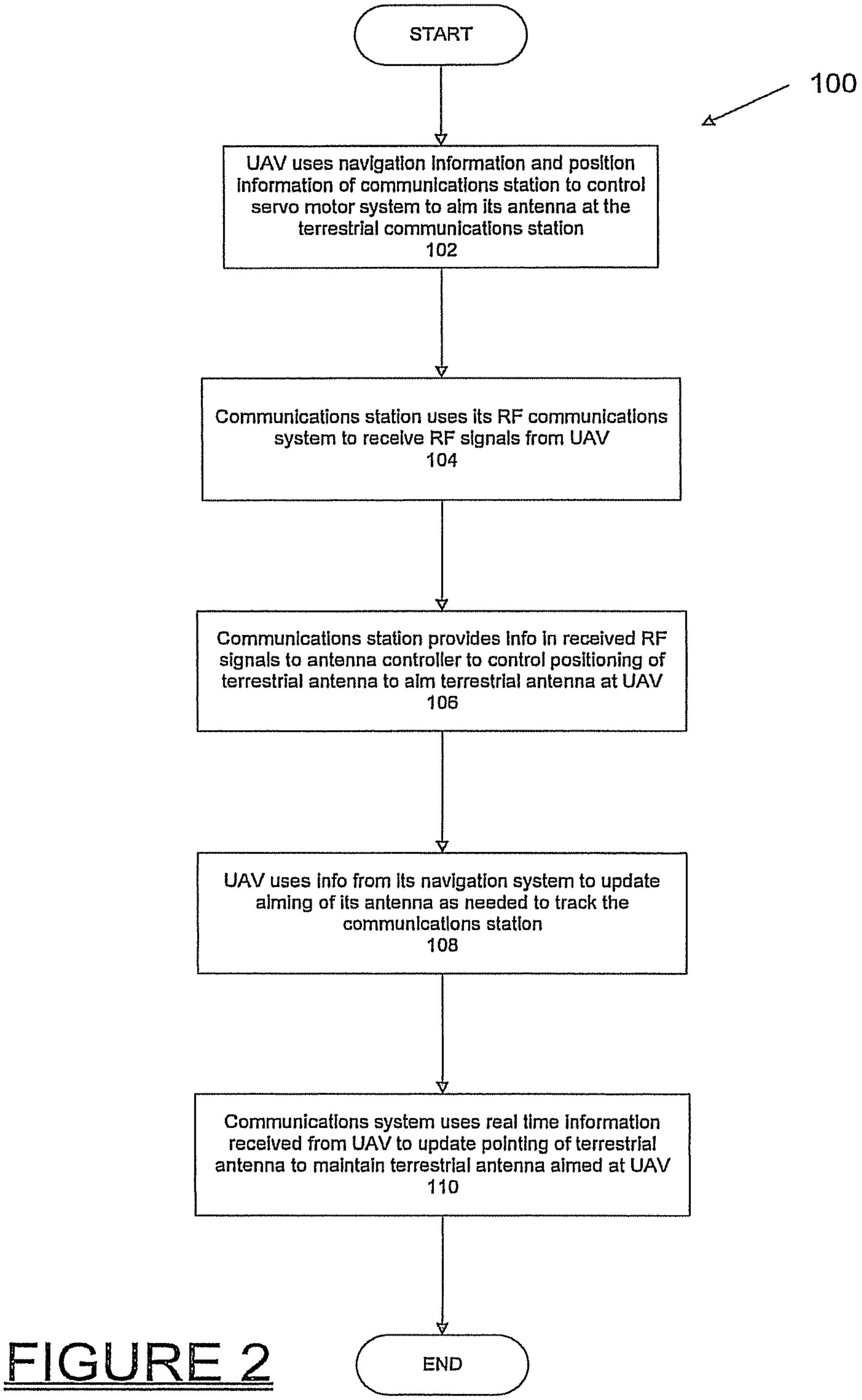
FIG. 2 is a flowchart illustrating major operations performed by the system of FIG. 1 when communicating between an unmanned vehicle and a remote communications station.

Referring to FIG. 2, a flow chart 100 of major operations performed by the system 10 is shown. At operation 102 the UAV 12 uses its navigation system or information from a GPS satellite, as well as info on the location of the communications station 14, to control the servo motor system 20*a* to aim its directional antenna 22 at the communications station 14. At operation 104 the communications station 14 uses its RF communications system 26 to receive the RF transmissions from the UAV 12. At operation 106, information in the RF transmissions relating to the real time location of the UAV 12 is provided to the antenna control system 28 which uses this information to aim the directional antenna 30 at the UAV 12. Thereafter, the antenna control system 20 uses navigation information from its onboard navigation system (not shown), or information provided by a GPS satellite system, and the known location of the communications station 14, to adjust pointing of the directional antenna 22 as needed to maintain the antenna 22 pointed at the antenna 30 of the communications station. Similarly, the communications station 14 uses real time information received from the UAV 12 as to the UAV's present location to cause the antenna control system 28 to aim the directional antenna 30 as needed to maintain the antenna 30 pointed at the UAV 14.

The system 10 and methodology described herein thus enables both the UAV 12 and the communications station 14 to implement independent antenna pointing control loops. This enables electrical power from the battery 24 to be used more effectively since the RF energy transmitted by the UAV 12 is focused directly at the communications station 14, rather than being radiated in an omnidirectional pattern. This can enable the effective communication range between the UAV 12 and the communications station 14 to be extended over what would be possible with a an omnidirectional antenna radiating an RF signal of comparable power. The reduced amount of electrical power needed for transmitting RF signals over a given distance also enables the UAV 12 to stay airborne for longer times before the battery 24 is depleted. The dual but independent antenna pointing control loops of the system 10 further provide added insurance that the RF communications link between the UAV 12 and the communications station 14 will be maintained in the event of temporary topographic or weather disturbances.

The system and method of communication described herein could also be used between several unmanned vehicles with the possibility of one acting as a relay between the more distant unmanned vehicle (in a peer-to-peer manner) and the ground station. The unmanned vehicle acting as a relay may either be configured with both an omnidirectional antenna and a directional-tracking antenna, so that the omnidirectional antenna may be used to communicate short range with another unmanned vehicle, while the tracking antenna could be used to communicate with the ground station, or a variation of this configuration. Alternatively, the unmanned vehicle that is acting as a relay could be equipped with several tracking antennas and may be configured to essentially act as an aerial communications relay.

It should be also be noted that in the event of a failure of either of the remote communications station 14 or the UAV 12 antenna tracking system components 20, 20*a*, 22, the ability to transfer communications to an omnidirectional antenna system is also possible via the use of an RF amplifier. An RF amplifier could be used in the emergency case of needing to switch to the omnidirectional antenna in order to get close to the same reception/transmission range. In the event of the UAV 12 antenna tracking system components 20, 20*a*, 22 failing, reception/transmissions could be transferred to an omnidirectional antenna on the UAV 12 while the remote communications station directional antenna 30 remains in an active tracking mode. The same method could also be applied in the event that the communications 14 station directional antenna 30 becomes inoperable.

Predictive tracking can also potentially be used if there is a high latency in the communications link. By "predictive tracking" it is meant that the communications station 14 or the UAV 12 could estimate where the UAV 12 will be, relative to the communications station 14, by taking into account the velocity vector of the UAV 12 and the position of the communications station 14. The communications station 14 could continue to track the UAV's 12 velocity vector until the next communications packet from the UAV 12 is received.

It will also be appreciated that various advanced control methods may be used in the antenna tracking systems of both the UAV 12 and the communications station 14. Such advanced control methods may include neural networks, fuzzy logic, or other adaptive and intelligent control techniques.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

The invention claimed is:

1. A communications system comprising:

an unmanned vehicle;

a remote terrestrial communications station located remote from said unmanned vehicle;

said unmanned vehicle including:

a first communications system;

a first directional antenna mounted on the unmanned vehicle, and configured to be at least one of electrically or mechanically scanned, for wirelessly communicating, using the first communications system, with said remote communications station;

a first antenna control system that tracks said remote terrestrial communications station and aims said first directional antenna, in real time, at said remote communications station during the wireless communications with said remote communications station, using position information obtained from one of an on-board navigation system or an orbiting satellite, and known location information for the remote terrestrial communications station;

said remote terrestrial communications station including:

a second communications system;

a second directional antenna, configured to be at least one of electrically or mechanically scanned, for wirelessly communicating, using the second communications system, said unmanned vehicle; and a second antenna control system that tracks said unmanned vehicle and aims said second directional antenna at said unmanned vehicle, in real time, during the wireless communications with said unmanned vehicle; and wherein the unmanned vehicle and the remote communications station each employ a real time closed loop antenna pointing control system.

2. The system of claim 1, wherein said first and second communications systems comprise electromagnetic wave communications systems.

3. The system of claim 1, wherein said first and second antennas each comprise phased array antennas configured to be electrically aimed.

4. The system of claim 1, wherein said second antenna control system uses information supplied by said first communications system of said unmanned vehicle to assist in tracking said unmanned vehicle.

5. The system of claim 1, wherein said second communications system uses information obtained from an orbiting satellite to track said unmanned vehicle, in real time, and to continuously aim said second directional antenna at said unmanned vehicle.

6. The system of claim 1, wherein said remote communications station communicates with said unmanned vehicle through a network.

7. The system of claim 1, wherein the unmanned vehicle includes a memory subsystem for storing a location of said remote communications station, and providing said location to said communications system.

8. A system comprising:

an unmanned vehicle;

a terrestrial remote subsystem;

a wireless communications system carried on-board the unmanned vehicle;

a directional antenna mounted on the unmanned vehicle, and configured to be at least one of electrically or mechanically scanned, for facilitating wireless communications, using the wireless communications system, the terrestrial remote subsystem through a real time, closed loop antenna pointing arrangement; and an antenna control system that aims said directional antenna, in real time, to track said terrestrial remote subsystem during the wireless communications with said terrestrial remote subsystem, using position information obtained from at least one of an on-board navigation subsystem or from an orbiting satellite;

and the wireless communications system further being configured to supply real time location information pertaining to the unmanned vehicle to the remote terrestrial subsystem for use by the remote terrestrial subsystem in tracking the unmanned vehicle with a second real time, closed loop, antenna pointing arrangement.

9. The system of claim 8, wherein said terrestrial remote subsystem includes a directional antenna component and a control system for the directional antenna component.

10. The system of claim 8, wherein said unmanned vehicle comprises an unmanned aerial vehicle.

11. The unmanned vehicle system of claim 10, wherein said unmanned aerial vehicle wirelessly communicates with a plurality of remote subsystems.

12. A method for communicating between a moving unmanned aerial vehicle and a terrestrial remote communications station, the method including:

using the moving unmanned aerial vehicle to wirelessly communicate with the remote terrestrial communications station;

controlling a first directional antenna mounted on the moving unmanned aerial vehicle, and configured to be at least one of electrically or mechanically scanned, such that said first directional antenna tracks said remote terrestrial communications station in a real time closed loop fashion using position information from one of an on-board navigation system or an orbiting satellite; and using a second directional antenna at said remote terrestrial communications station configured to receive real time position information from the unmanned vehicle, to track said unmanned vehicle in a closed loop fashion using the real time position information.

13. The method of claim 12, wherein controlling the first directional antenna comprises controlling a first phased array antenna, and wherein using the second directional antenna comprises using a second phased array antenna.

14. The method of claim 12, wherein using the unmanned vehicle comprises using an unmanned air vehicle (UAV), and wherein using the second directional antenna at said remote communications station comprises using the second directional antenna at a terrestrial based communications station.

* * * * *